United States Patent
Leonard et al.

(10) Patent No.: US 11,695,625 B2
(45) Date of Patent: Jul. 4, 2023

(54) LOCATION-BASED DYNAMIC GROUPING OF IOT DEVICES

(71) Applicant: INTERNATIONAL BUSINESS MACHINES CORPORATION, Armonk, NY (US)

(72) Inventors: Jackson P. Leonard, Austin, TX (US); Ajit Jariwala, Cary, NC (US); Eric B. Libow, Raleigh, NC (US); Thomas Scott Wallace, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 17/376,215

(22) Filed: Jul. 15, 2021

(65) Prior Publication Data

US 2023/0014584 A1 Jan. 19, 2023

(51) Int. Cl.
| | |
|---|---|
| *H04L 41/0813* | (2022.01) |
| *H04L 41/22* | (2022.01) |
| *H04W 4/33* | (2018.01) |
| *H04L 41/0893* | (2022.01) |
| *H04W 4/029* | (2018.01) |
| *H04W 84/18* | (2009.01) |
| *G16Y 30/00* | (2020.01) |

(52) U.S. Cl.
CPC ...... *H04L 41/0813* (2013.01); *H04L 41/0893* (2013.01); *H04L 41/22* (2013.01); *H04W 4/029* (2018.02); *H04W 4/33* (2018.02); *G16Y 30/00* (2020.01); *H04W 84/18* (2013.01)

(58) Field of Classification Search
CPC .................................................. H04L 41/0813
See application file for complete search history.

(56) References Cited

U.S. PATENT DOCUMENTS

| | | | |
|---|---|---|---|
| 8,995,923 B2 | 3/2015 | Jabara | |
| 9,853,826 B2 | 12/2017 | Shuman et al. | |
| 10,911,544 B2 | 2/2021 | Cook | |
| 2016/0140257 A1 | 5/2016 | Vega | |
| 2016/0173293 A1 | 6/2016 | Kennedy | |
| 2018/0020329 A1 | 1/2018 | Smith | |
| 2018/0288209 A1* | 10/2018 | Kim | H04W 4/80 |
| 2019/0098028 A1* | 3/2019 | Ektare | G06F 21/577 |
| 2020/0068408 A1* | 2/2020 | Korrapati | G01S 5/0244 |
| 2020/0177589 A1 | 6/2020 | Mangalvedkar | |
| 2020/0294503 A1 | 9/2020 | Ryu | |

FOREIGN PATENT DOCUMENTS

JP      6584951 B2    10/2019

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Hsinchun Liao
(74) *Attorney, Agent, or Firm* — Kristofer Haggerty

(57) ABSTRACT

A method, computer system, and a computer program product for dynamic internet of things (IoT) device grouping is provided. After an initial location of an IoT device is set, a current location of the IoT device is later determined. Thereafter, the determined current location is compared to the initial location. Responsive to determining that the current location does not match the initial location based on the comparing, a new IoT device group is assigned to the IoT device.

20 Claims, 7 Drawing Sheets

LOCATION-BASED DYNAMIC GROUPING OF IOT DEVICES

BACKGROUND

The present invention relates generally to the field of computing, and more particularly to Internet of Things (IoT) device management.

Today's IoT-enabled devices, such as light bulbs, switches, speakers, and the like are often used in locations consisting of multiple rooms or other partitions, such as in a home or office setting. Typically, initial setup of the devices requires a user to manually arrange the devices into room-based groups within the IoT's management tool. However, many IoT devices are mobile and may therefore be subsequently moved by a user to a different location.

SUMMARY

According to one exemplary embodiment, a method for dynamic internet of things (IoT) device grouping is provided. The method may include setting an initial location of an IoT device and later determining a current location of the IoT device. Then, the determined current location is compared to the initial location. Responsive to determining that the current location does not match the initial location based on the comparing, a new IoT device group is assigned to the IoT device. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
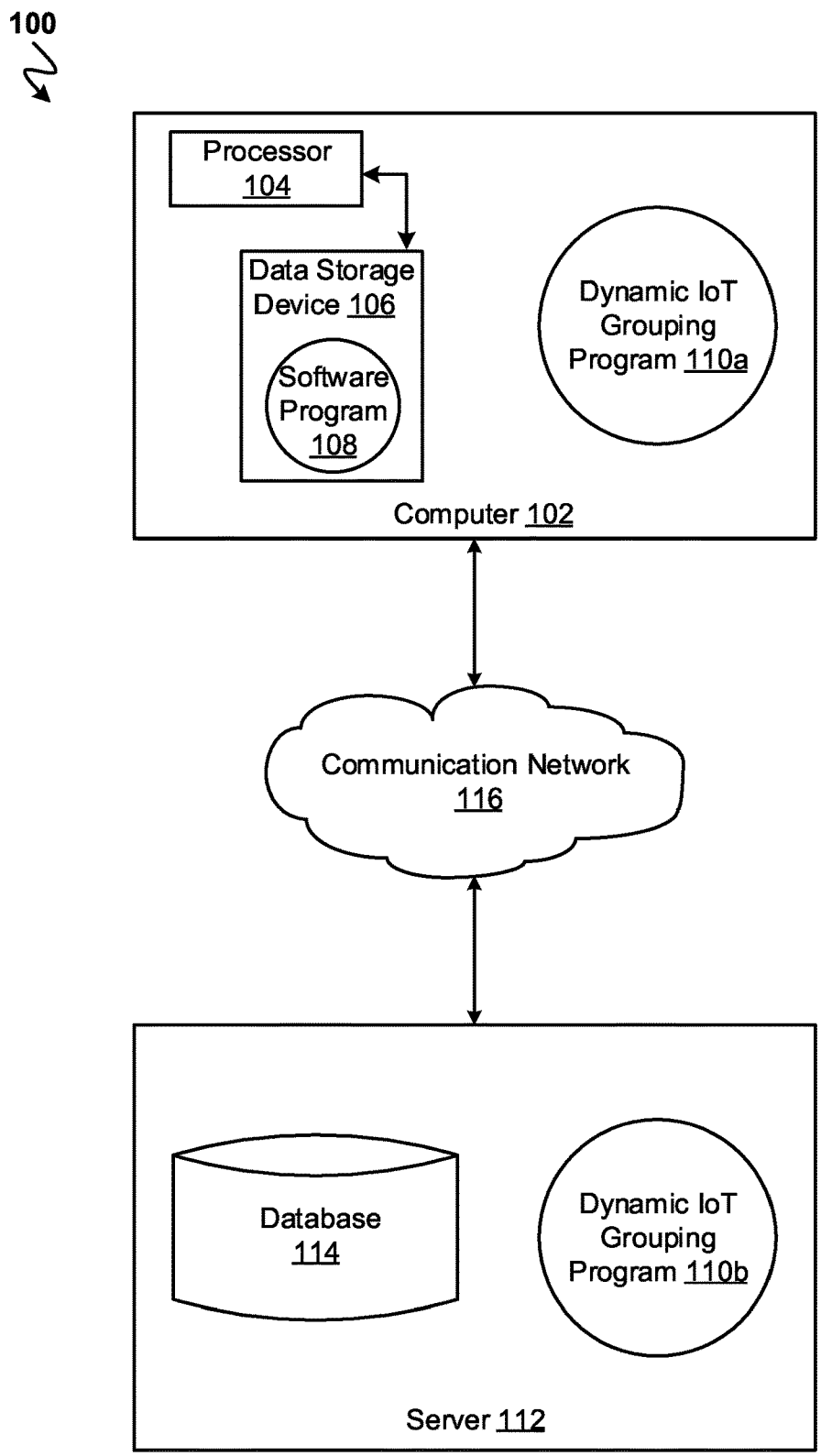
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As described above today's IoT-enabled devices, such as light bulbs, switches, speakers, and the like are often used in locations consisting of multiple rooms or other partitions, such as in a home or office setting. Typically, initial setup of the devices requires a user to manually arrange the devices into room-based groups within the IoT's management tool. However, many IoT devices are mobile and may therefore be subsequently moved by a user to a different location.

Therefore, it may be advantageous to, among other things, provide a way to automatically detect that an IoT device has moved and then present to a user a suggestion to re-arrange or regroup the device in the IoT management tool for the IoT-enabled environment in which the device exists. It may be further advantageous to, in some embodiments, automatically re-arrange the IoT device based on a new detected location of the IoT device.

There exist a variety of IoT-enabled environments in which devices may be arranged across multiple rooms or other designated areas, which may be used to coordinate actions across associated devices. For example, a device may exist in the context of a "smart home" consisting of multiple different rooms, and a user of the smart home may execute actions on devices based on the rooms in which they are located, in which case the user-specified action may be to "play the speaker in the living room." Other environments may include office buildings, hospitals, agricultural settings, and so forth. As such, while the present disclosure often refers to a home environment in the examples described herein, it will be appreciated that the present disclosure can be applied to any IoT-enabled environment.

Existing methods may require devices to be manually arranged into room-based groups within the management tool for the IoT-enabled environment. When a device is physically moved from one room to another room, a user of the IoT management tool would have to reconfigure the device within the tool so that the tool is aware of the device's new location. An example of an IoT management tool (i.e., IoT management system software) may include Yeti and similar such tools that manage and coordinate a set of IoT devices.

According to at least one embodiment of the present disclosure, a method is provided in which the device detects that the device's location has changed, and notifies the management and/or automation tool for the IoT-enabled environment that the device has moved to a new room or location, and provide the user with a suggestion or notice to update the location of the device within the management tool. In implementations, automatic acceptance of these location updates may be set to avoid user interaction. To detect a device has moved, and then determine the device's new location, may use methods that, for example, compare the relative proximity of a device to neighboring devices within the IoT environment or a router (i.e., gateway) used to broadcast the network on which the devices reside. By comparing the relative proximity of a given device (to the other devices in the IoT environment) with the arrangement of the devices defined within the management tool, any discrepancies may indicate that a device was moved to a new location. When such a discrepancy is identified, the management and/or automation tool may suggest that the user update the IoT device grouping, or automatically update the IoT device grouping.

The following described exemplary embodiments provide a system, method and program product for automatically detecting an IoT device location change. As such, the present embodiment has the capacity to improve the technical field of IoT device management by automatically detecting IoT device location changes and determining a suggested grouping and applicable rules for the device based on the new location.

As used herein, IoT devices may include any electronic computing device that connects wirelessly to a network and transmit data. Often IoT devices collect data via sensors (e.g., microphone or camera) and/or generate output based on received data (e.g., a speaker playing audio data received wirelessly or a smart light that switches on/off and changes brightness and color in response to user instructions or defined rules). Examples include, but are not limited to, smart light fixtures, speakers, thermostats, door locks, and so forth. IoT devices may be used in consumer applications, such as a smart home, or in commercial or other settings such as agriculture, hospitals, office buildings, and so forth.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic IoT grouping program 110a. The networked computer environment 100 may also include a server 112 that is enabled to run a dynamic IoT grouping program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic IoT grouping program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic IoT grouping program 110a, 110b (respectively) to automatically detect IoT device location changes and generate a suggested grouping change based on the new location of the IoT device. The dynamic IoT grouping method is explained in more detail below with respect to FIGS. 2 and 3A-B.

Figure 2:
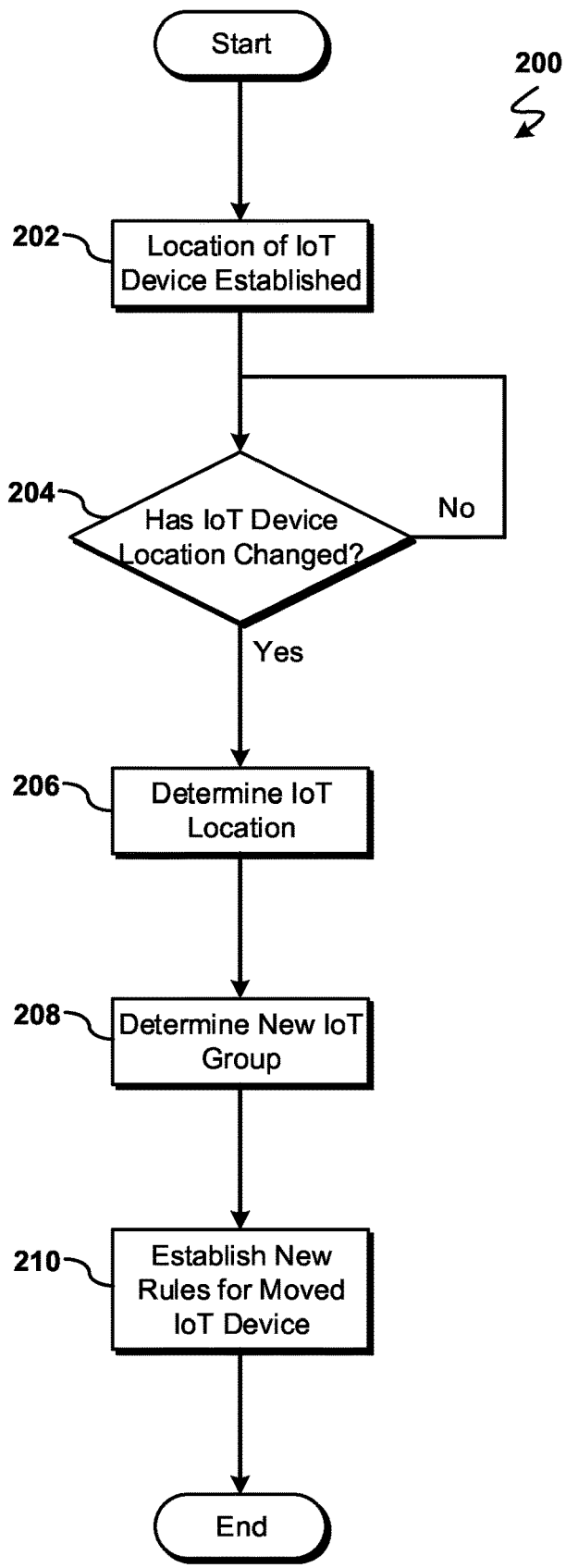
FIG. 2 is an operational flowchart illustrating a process for location-based dynamic IoT device grouping according to at least one embodiment.

Referring now to FIG. 2, an operational flowchart illustrating the exemplary location-based dynamic IoT device grouping process 200 used by the dynamic IoT grouping program 110a and 110b according to at least one embodiment is depicted.

Figure 3A:
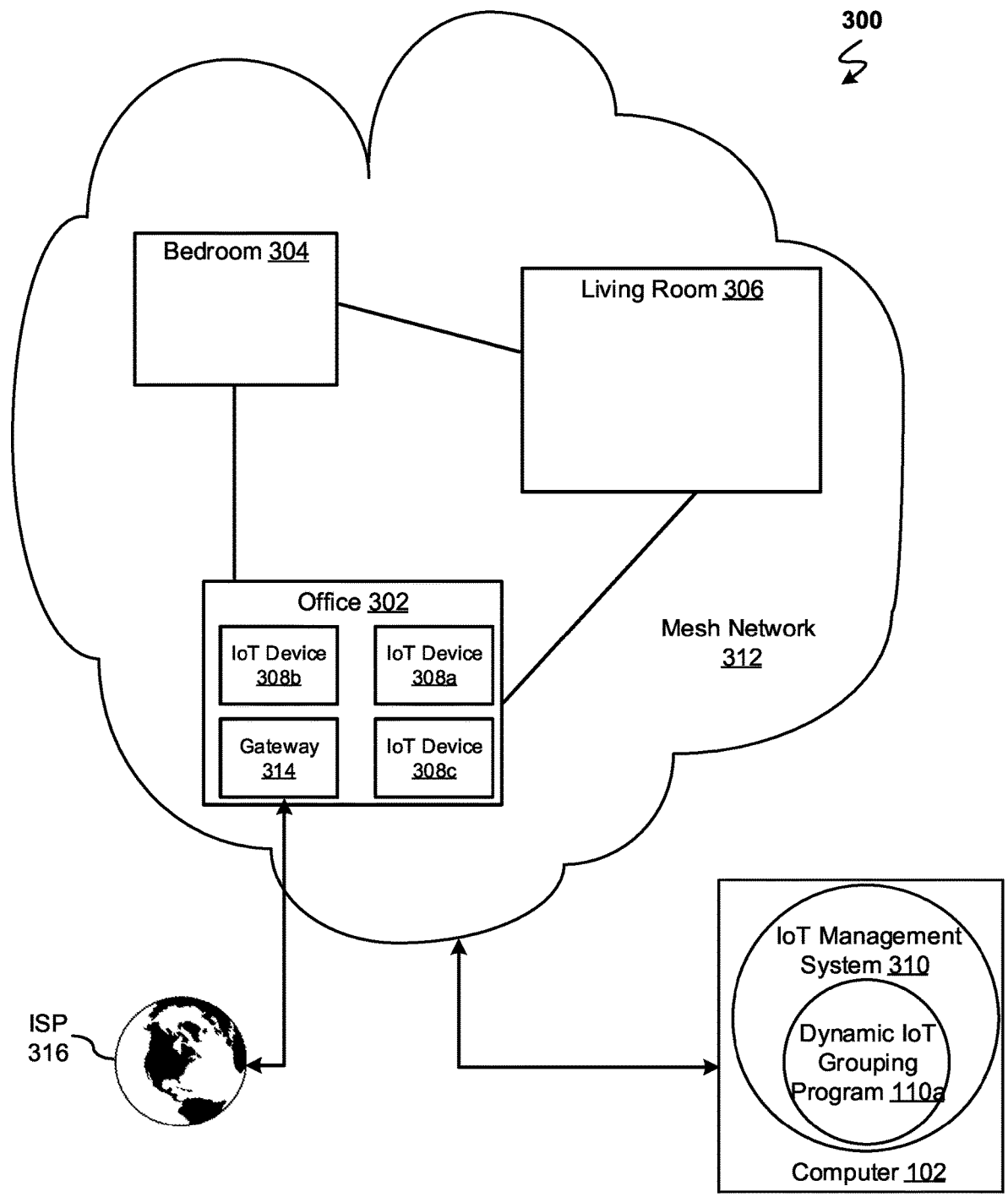
FIGS. 3A-B is a block diagram of an exemplary home IoT environment according to at least one embodiment.

At 202 the location of an Internet of Things (IoT) device is established. According to embodiments, a user may establish, set, or initialize the location of an IoT device by manually indicating a location within IoT management system software. For example, the IoT management system software (e.g., software program 108) which implements the dynamic IoT grouping program 110a and 110b may provide the user with a graphical user interface (GUI) which lists available IoT devices and allows the user to designate a location-based group for each IoT device. More specifically, and as illustrated in FIG. 3A, an exemplary initial arrangement of a home IoT environment 300 of user Joel is depicted. Joel may begin setting up groups of IoT devices 308a-c for his home IoT environment 300 which includes the locations of an Office 302, a Bedroom 304, and a Living Room 306 created within the IoT management system 310 running the dynamic IoT grouping program 110a on Joel's computer 102. Joel may then select an IoT device 308a-c, such as Joel's wireless speaker (i.e., IoT device 308a), and assign the IoT device 308a to a location-based group, such as the Office 302. As such, Joel has used the GUI within the IoT management system 310 to assign the wireless speaker IoT device 308a to the Office 302 group. Joel may then proceed in like manner to assign smart lights, smart thermostats, and so forth to location groups using the IoT management system 310. As depicted in FIG. 3A, Joel sets the grouping of the IoT devices 308a-c and the gateway 314 to the Office 302 within the IoT management system 310.

The IoT devices 308a-c managed by the IoT management system 310 may be organized into a mesh network 312. A mesh network 312 (i.e., a meshnet) is an infrastructure of nodes that are wirelessly connected with each other based on mesh topology. The nodes (i.e., IoT devices 308a-c) work together to distribute and transmit data to the destination in the network. A mesh network 312 may be a local network topology whereby connected devices (e.g., IoT devices 308a-c), including end-points and edge devices, connect directly, dynamically, and in a non-hierarchical manner to multiple devices to co-operate according to a pre-defined protocol to route data across the mesh network 312. Examples of mesh network 312 protocols include Wirepas® (Wirepas and all Wirepas-based trademarks and logos are trademarks or registered trademarks of the Wirepas Ltd. and/or its affiliates), Zigbee® (Zigbee and all Zigbee-based trademarks and logos are trademarks or registered trademarks of the Zigbee Alliance and/or its affiliates), and Thread® (Thread and all Thread-based trademarks and logos are trademarks or registered trademarks of the Thread Group, Inc. and/or its affiliates). Depending on the specific implementation, a full mesh (i.e., all nodes are directly connected with each other) or partial-mesh network (i.e., not all of the nodes are directly connected with each other) may be used.

According to at least one embodiment, once an IoT device 308a-c has been initially set up within the IoT management system 310 software, location data of the IoT device 308a-c may be measured and recorded. Location data for each IoT device 308a-c may be derived from measuring wireless communication signal strength. For example, Joel's mesh network 312 includes IoT device 308a (i.e., wireless speaker), IoT device 308b, IoT device 308c, and a gateway 314 (i.e., router) connected to an internet service provider (ISP) 316 via the communication network 116. To collect location data for IoT device 308a, the signal strength between IoT device 308a and IoT device 308b may be measured and recorded, the signal strength between IoT device 308a and IoT device 308c may be measured and recorded, and the signal strength between IoT device 308a and the gateway 314 may be measured and recorded. This set of signal strength data may be stored in a data repository, such as a database 114. In like manner, the signal strength-based location data may be collected and recorded for the rest of the mesh network 312 (i.e., IoT device 308b, IoT device 308c, and the gateway 314). In some embodiments, multiple signal strength readings may be taken and averaged (e.g., five signal strength measurements may be recorded at 5 minute intervals between IoT device 308a and IoT device 308b and then averaged, the same is then done between IoT device 308a and IoT device 308c, and so on) to generate baseline signal strength values which are stored.

Returning to FIG. 2, at 204, the location-based dynamic IoT device grouping process 200 determines if an IoT device 308a-c location has changed. According to at least one embodiment, the signal strength between IoT devices 308a-c may be polled periodically and compared with the baseline signal strength recorded earlier at 202. If the signal strength differs from the baseline to the extent (plus or minus) that a threshold is exceeded, the location-based dynamic IoT device grouping process 200 may determine that the location of the IoT device 308a-c has changed. A threshold may be predefined or may be set by a user through the IoT management system 310. For example, if certain rooms or other logical partitions of space are large within an environment (e.g., home IoT environment 300), such as rooms in a large home contrasted with rooms in a small apartment, the user may set the signal strength threshold to a higher number to account for more intra-room movement of IoT devices 308a-c and therefore prevent false positive determinations of IoT device 308a-c relocation. In some embodiments, the user may optionally define differing thresholds for individual rooms within the IoT management system 310 to finetune the location-based dynamic IoT device grouping process 200 and account for different rooms having different sizes (e.g., a garage versus a closet).

Figure 3B:
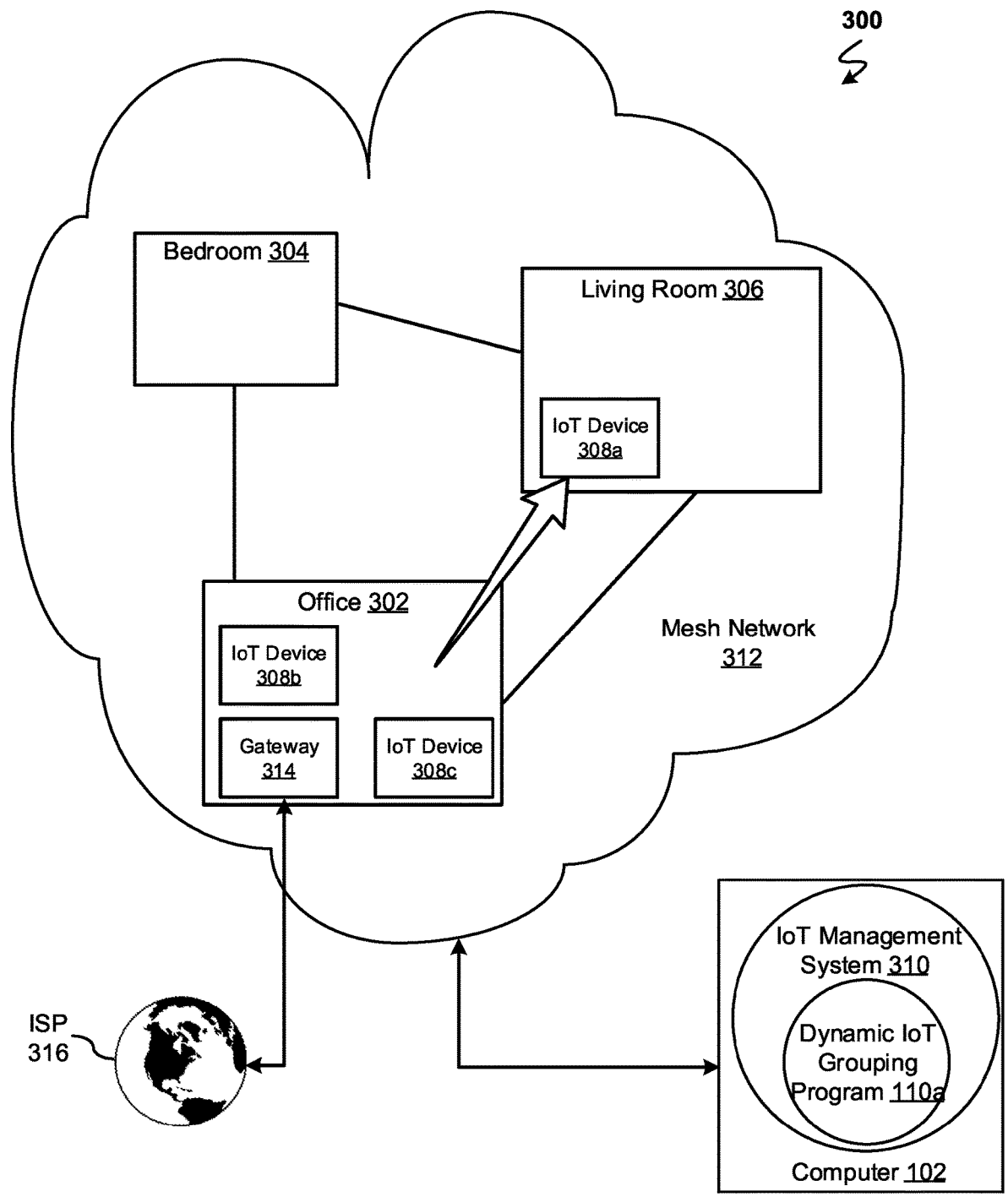

Continuing the prior example, and with reference to FIG. 3B, Joel moves a wireless speaker (i.e., IoT device 308a) from the Office 302 to the Living Room 306. The initial baseline signal strength for IoT device 308a to IoT device 308b is −53 dBm (decibel-milliwatts), IoT device 308a to IoT device 308c is −54 dBm, and from IoT device 308a to the gateway is −50 dBm. The Office 302 still contains IoT devices IoT device 308b and IoT device 308c and the gateway 314. As a result of moving the wireless speaker, the signal strength from IoT device 308a to IoT device 308b changed to −58 dBm, IoT device 308a to IoT device 308c changed to −57 dBm, and IoT device 308a to the gateway 314 changed to −60 dBm. Thus, the signal strength delta is 5 dBm, 3 dBm, and 10 dBm, respectively. In this example, the signal strength threshold value is 5 dBm. While not all of the signal strength deltas exceeded the threshold, at least one did exceed the threshold, and, therefore, according to at least one embodiment, the location-based dynamic IoT device grouping process 200 will determine that an IoT device's 308a-c location changed. It may be appreciated that in other embodiments, a threshold number of device-to-device signal strength deltas exceeding the signal strength threshold may need to be met before determining an IoT device 308a-c moved, a percentage of device-to-device signal strength deltas exceeding the signal strength threshold may need to be met before determining an IoT device 308a-c moved, or some combination of criteria may be used to determine if an IoT device 308a-c has changed locations.

Returning to FIG. 2, if the signal strength thresholds for the IoT devices 308a-c have not been exceeded, the location-based dynamic IoT device grouping process 200 will determine that no IoT devices 308a-c have changed location and will continue to poll signal strengths and repeat 204.

However, if the location-based dynamic IoT device grouping process 200 determined that an IoT device 308a-c has changed location at 204, then the new location of the IoT device 308a-c is determined at 206. According to at least one embodiment, the location-based dynamic IoT device grouping process 200 may forgo determining the new location of the IoT device 308a-c and just recognize the IoT device 308a-c has moved and present the user with a notification, for example via the IoT management system 310, alerting the user that the IoT device 308a-c has moved and may give the user an opportunity to select an new group for the moved IoT device 308a-c. Thereafter, the user may interact with the IoT management system 310 (e.g., via a GUI) to select a new location or group for the IoT device 308a-c that moved. This user-selected group may be reflected in an IoT group indicator (e.g., the string "Living Room" which corresponds to the Living Room 306 group) which is received by the IoT management system 310 in response to the user selection.

According to some embodiments, the location-based dynamic IoT device grouping process 200 may automatically determine the new location of the IoT device 308a-c. In embodiments, signal strength data may be used to determine a position of an IoT device 308a-c and it may be appreciated that other implementations may use other known methods for determining device location. For example, trilateration or triangulation may be used to determine device position. Depending on the specific IoT device 308a-c, device sensors, such as cameras or GPS receivers, may optionally be leveraged to determine the IoT device's 308a-c location. For instance, if the IoT device 308a-c has a camera, a picture of the new location may be compared with known images or maps and image analysis may be performed to match objects within the camera image to the known location of similar objects. In some embodiments, after a new location is automatically determined, the user may be notified and the new location may be presented (e.g., via a dialog box) as a suggestion to the user and allow the user to alter the suggested new location or confirm the relocation suggestion is correct. In other embodiments, the IoT management system 310 may automatically accept and process the IoT device 308a-c location change.

Continuing the previous example depicted in FIG. 3B, when Joel moves the wireless speaker IoT device 308a from the Office 302 to the Living Room 306, signal strength delta between IoT device 308a (i.e., the wireless speaker) and IoT device 308c was much less (3 dBm) compared to the delta between IoT device 308a and the gateway 314 (10 dBm). If the locations of IoT device 308c and the gateway are known within the Office 302, based on the signal strength deltas, the location-based dynamic IoT device grouping process 200 determines that IoT device 308a moved Northeast which, based on previously input mapping data such as a floorplan, is where the location-based dynamic IoT device grouping process 200 determines the Living Room 306 is located. Thus, the location-based dynamic IoT device grouping process 200 determines that IoT device 308a moved to the Living Room 306.

Returning to FIG. 2, at 208, a new group is determined and assigned to the IoT device 308a-c that changed locations. According to at least one embodiment, in response to the location-based dynamic IoT device grouping process 200 determining the new location of the IoT device 308a-c automatically or in response to the user's manual input, as described previously at 206, the IoT management system 310 may assign a new location-based group to the IoT device 308a-c. In embodiments, the IoT management system 310 may also remove the relocated IoT device 308a-c from the IoT device's 308a-c prior group and assign a new group for the IoT device 308a-c according to the new location of the IoT device 308a-c. Continuing the prior example, the IoT management system 310 will remove Joel's wireless speaker IoT device 308a from the Office 302 group and then assign the wireless speaker to the Living Room 306 group.

Then, at 210, new rules will be established for the moved IoT device 308a-c based on the new group the IoT device 308a-c was assigned to. According to at least one embodiment, as a result of assigning the moved IoT device 308a-c to a new group, the rules associated with the new group will be applied to the moved IoT device 308a-c. Additionally, the rules governing the prior group that the moved IoT device 308a-c belonged to will be removed from the moved IoT device 308a-c and no longer apply to the moved IoT device 308a-c.

Continuing the previous example, Joel's wireless speaker IoT device 308a will no longer be subject to the rules associated with the Office 302 group and the IoT management system 310 will then apply the rules of the Living Room 306 group to the wireless speaker. Thus, if IoT device 308b in the Office 302 is also a speaker and newly moved speaker IoT device 308a is now in the Living Room 306, if Joel then speaks the command "play Office speaker," the IoT management system 310 will instruct IoT device 308b to play and IoT device 308a will not. Likewise, if Joel says "play Living Room speaker," speaker IoT device 308a will play and IoT device 308b will not.

It may be appreciated that FIGS. 2 and 3A-B provide only an illustration of one embodiment and do not imply any limitations with regard to how different embodiments may be implemented. Many modifications to the depicted embodiment(s) may be made based on design and implementation requirements.

As described in embodiments above, the dynamic IoT grouping program 110a and 110b may improve the functionality of a computer by automatically detecting when an IoT device 308a-c has moved locations and, in some embodiments, prompt a user to update the IoT device's 308a-c location thereby updating the attendant rules within the IoT management system 310. In other embodiments, the IoT management system 310 may be further enhanced by automatically detecting the IoT device's 308a-c new location, dynamically changing the IoT device grouping to reflect the new location of the IoT device 308a-c, and further applying the appropriate new rules accordingly without user interaction. As such, the functionality of IoT management systems 310 are enhanced since the IoT management systems 310 may dynamically reconfigure IoT device 308a-c rules based on detected locations without wasting time and resources prompting a user and requiring user feedback to process the relocation.

Figure 4:
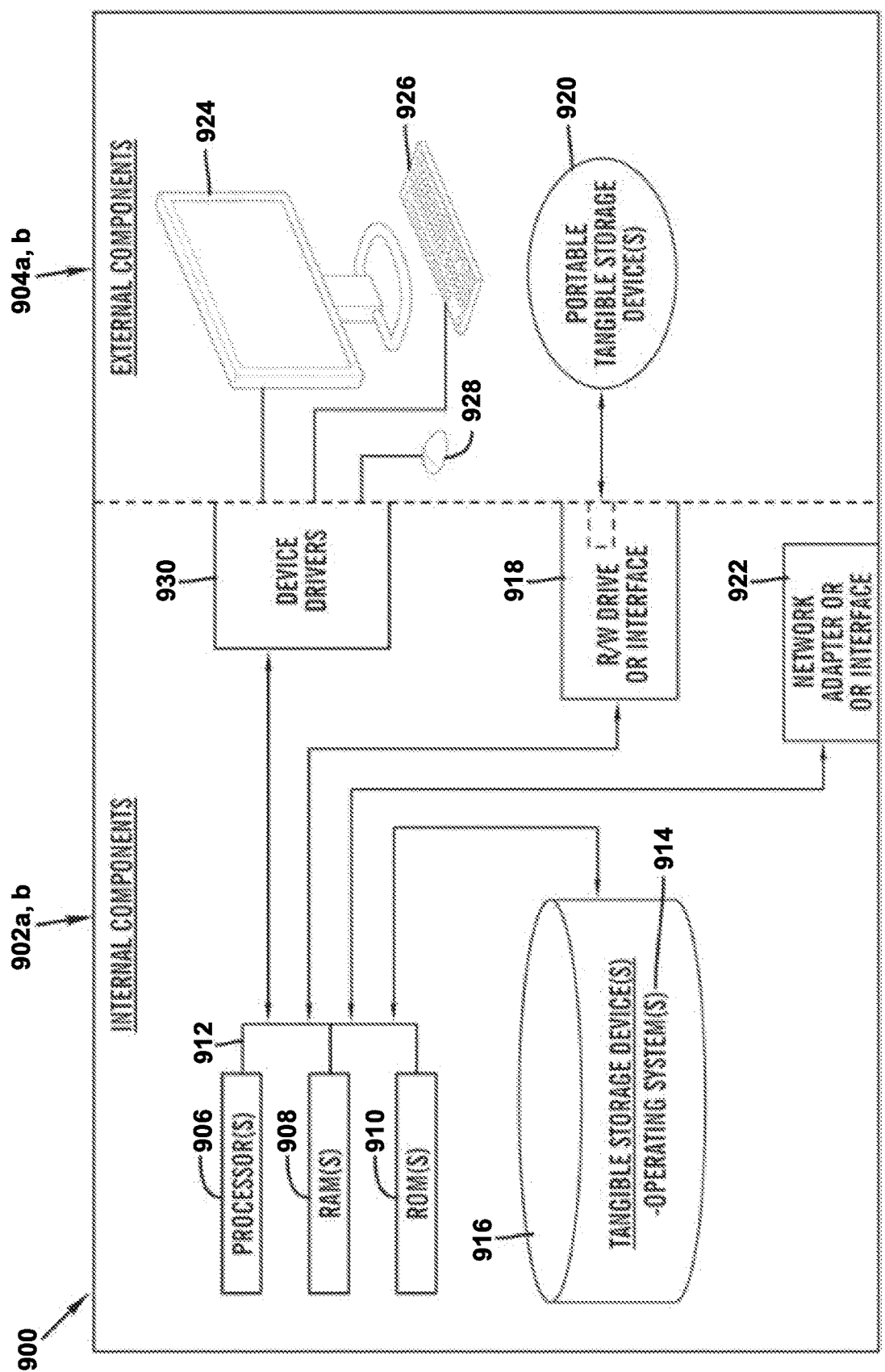
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the dynamic IoT grouping program 110a in client computer 102, and the dynamic IoT grouping program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a RAY drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic IoT grouping program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic IoT grouping program 110a in client computer 102 and the dynamic IoT grouping program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic IoT grouping program 110a in client computer 102 and the dynamic IoT grouping program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
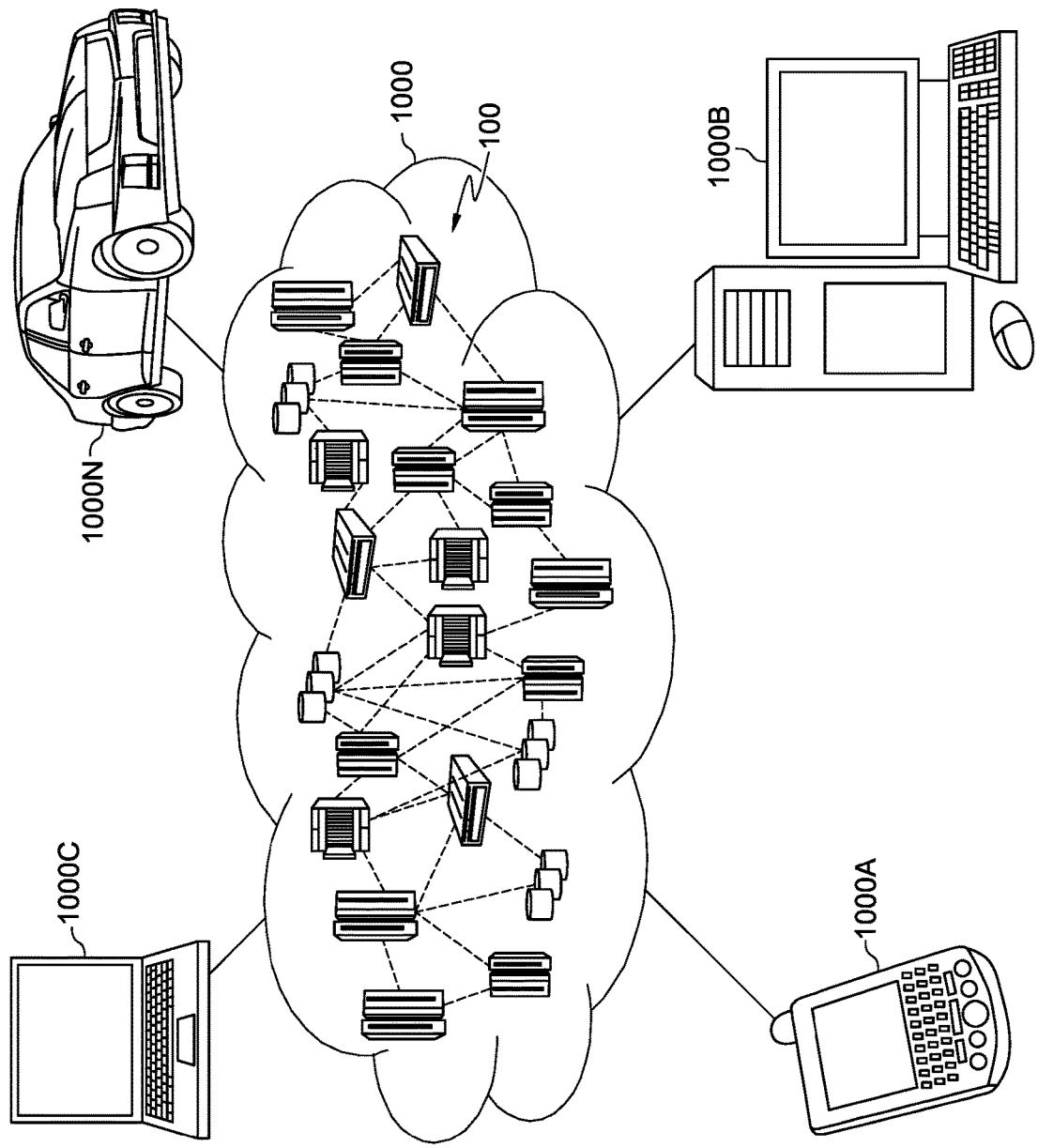
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
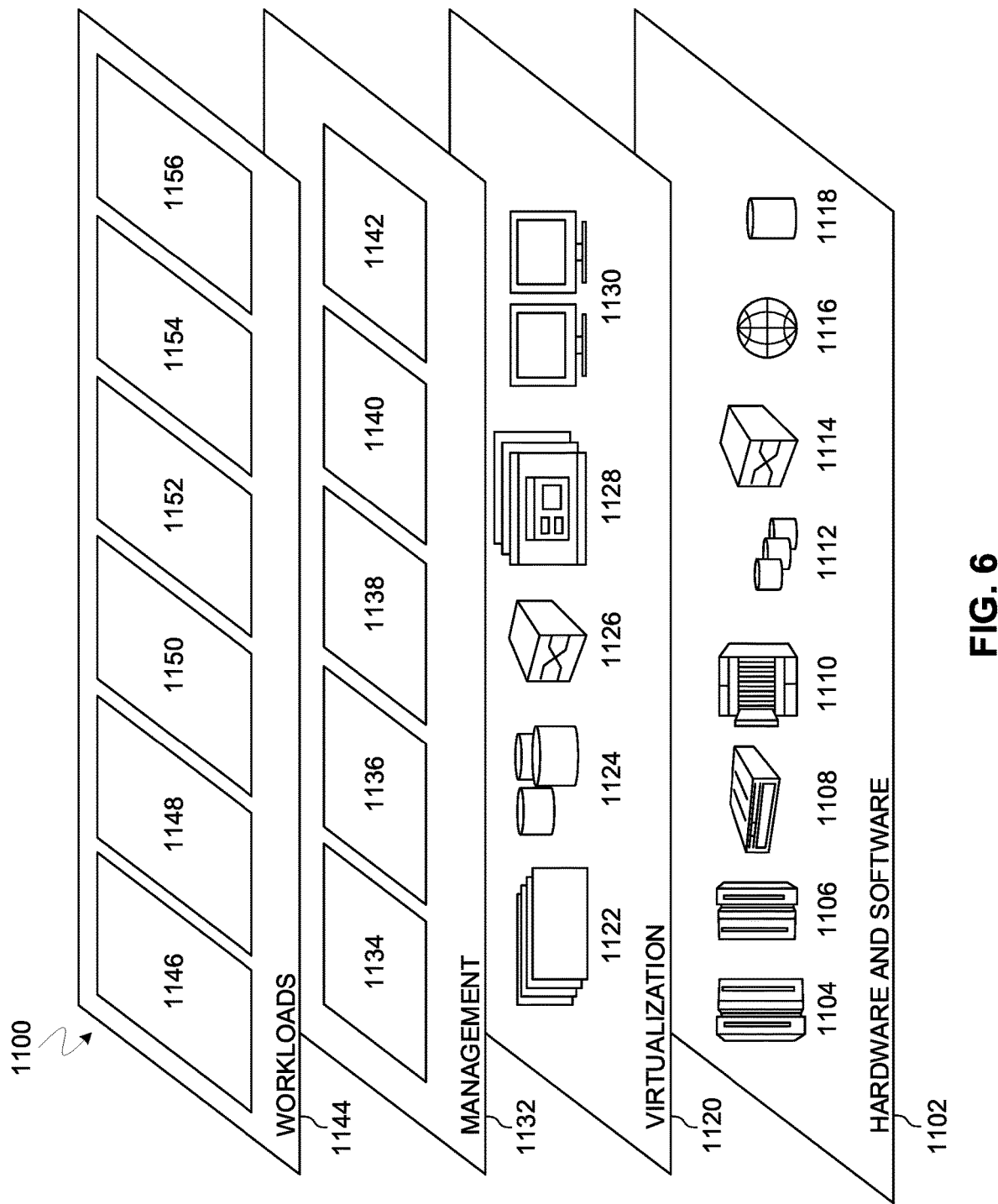
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic IoT grouping 1156. A dynamic IoT grouping program 110a, 110b provides a way to automatically determine an IoT device 308a-c has moved to a different location and provide a user with a suggested group assignment for the IoT device 308a-c based on the new location of the IoT device 308a-c.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamic internet of things (IoT) device grouping, the method comprising:
    setting an initial location of an IoT device;
    determining a current location of the IoT device;
    comparing the determined current location to the initial location; and
    responsive to determining that the current location does not match the initial location based on the comparing, assigning a new IoT device group to the IoT device.

2. The computer-implemented method of claim 1, wherein assigning the new IoT device group to the IoT device comprises applying a rule set associated with the new IoT device group to the IoT device.

3. The computer-implemented method of claim 1, wherein assigning the new IoT device group to the IoT device comprises notifying a user that the IoT device has moved.

4. The computer-implemented method of claim 3, further comprising:
    receiving a user-selected IoT group indicator corresponding with the new IoT device group.

5. The computer-implemented method of claim 1, wherein setting the initial location of the IoT device comprises measuring an initial signal strength and wherein determining the current location of the IoT device comprises measuring a current signal strength.

6. The computer-implemented method of claim 5, wherein comparing the determined current location to the initial location comprises comparing the initial signal strength to the current signal strength.

7. The computer-implemented method of claim 6, wherein measuring the initial signal strength when setting the initial location of the IoT device comprises measuring the initial signal strength between the IoT device and one or more additional IoT devices within a mesh network, and wherein measuring the current signal strength comprises measuring the current signal strength between the IoT device and the one or more additional IoT devices within the mesh network.

8. A computer system for dynamic internet of things (IoT) device grouping, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

setting an initial location of an IoT device;
determining a current location of the IoT device;
comparing the determined current location to the initial location; and
responsive to determining that the current location does not match the initial location based on the comparing, assigning a new IoT device group to the IoT device.

9. The computer system of claim 8, wherein assigning the new IoT device group to the IoT device comprises applying a rule set associated with the new IoT device group to the IoT device.

10. The computer system of claim 8, wherein assigning the new IoT device group to the IoT device comprises notifying a user that the IoT device has moved.

11. The computer system of claim 10, further comprising:
receiving a user-selected IoT group indicator corresponding with the new IoT device group.

12. The computer system of claim 8, wherein setting the initial location of the IoT device comprises measuring an initial signal strength and wherein determining the current location of the IoT device comprises measuring a current signal strength.

13. The computer system of claim 12, wherein comparing the determined current location to the initial location comprises comparing the initial signal strength to the current signal strength.

14. The computer system of claim 13, wherein measuring the initial signal strength when setting the initial location of the IoT device comprises measuring the initial signal strength between the IoT device and one or more additional IoT devices within a mesh network, and wherein measuring the current signal strength comprises measuring the current signal strength between the IoT device and the one or more additional IoT devices within the mesh network.

15. A computer program product for dynamic internet of things (IoT) device grouping, comprising a computer-readable storage medium having program instructions embodied therewith, the program instructions executable by a processor to cause the processor to perform a method comprising:
setting an initial location of an IoT device;
determining a current location of the IoT device;
comparing the determined current location to the initial location; and
responsive to determining that the current location does not match the initial location based on the comparing, assigning a new IoT device group to the IoT device.

16. The computer program product of claim 15, wherein assigning the new IoT device group to the IoT device comprises applying a rule set associated with the new IoT device group to the IoT device.

17. The computer program product of claim 15, wherein assigning the new IoT device group to the IoT device comprises notifying a user that the IoT device has moved.

18. The computer program product of claim 17, further comprising:
receiving a user-selected IoT group indicator corresponding with the new IoT device group.

19. The computer program product of claim 15, wherein setting the initial location of the IoT device comprises measuring an initial signal strength and wherein determining the current location of the IoT device comprises measuring a current signal strength.

20. The computer program product of claim 19, wherein comparing the determined current location to the initial location comprises comparing the initial signal strength to the current signal strength.

* * * * *